US006294373B1

(12) United States Patent
van Lith

(10) Patent No.: US 6,294,373 B1
(45) Date of Patent: Sep. 25, 2001

(54) METHOD FOR BIOLOGICAL CLEANING OF A CONTAMINATED GAS FLOW

(75) Inventor: Christianus Petrus Maria van Lith, Woudenberg (NL)

(73) Assignee: Mansanto Europe S.A., Brussels (BE)

( * ) Notice: Subject to any disclaimer, the term of this patent is extended or adjusted under 35 U.S.C. 154(b) by 0 days.

(21) Appl. No.: 09/590,218

(22) Filed: Jun. 8, 2000

(30) Foreign Application Priority Data

Jun. 8, 1999 (EP) .................................................. 99870122

(51) Int. Cl.$^7$ ........................................................ A61L 9/01
(52) U.S. Cl. ............................ 435/266; 96/234; 96/243; 96/267; 96/303; 422/168; 422/172
(58) Field of Search .................................. 435/262.5, 264, 435/266; 210/188; 96/234, 243, 267, 271, 303; 422/168, 172

(56) References Cited

U.S. PATENT DOCUMENTS

| | | | |
|---|---|---|---|
| 3,803,805 | 4/1974 | Low | 55/73 |
| 3,969,094 | 7/1976 | Dunson, Jr. et al. | 55/242 |
| 4,056,371 | 11/1977 | Diemer, Jr. et al. | 55/90 |
| 4,057,404 | 11/1977 | Diemer, Jr. et al. | 55/90 |
| 4,544,381 | * 10/1985 | Schmidt | 55/89 |
| 4,662,900 | 5/1987 | Ottengraf | 55/90 |
| 4,781,732 | 11/1988 | Wondrasch et al. | 55/10 |
| 4,806,148 | 2/1989 | Ottengraf | 55/223 |
| 4,976,751 | 12/1990 | Schippert | 55/84 |
| 5,637,498 | 6/1997 | Ottengraf et al. | 435/264 |
| 5,681,470 | * 10/1997 | Sfi | 210/603 |
| 6,143,553 | * 11/2000 | Teller | 435/266 |

FOREIGN PATENT DOCUMENTS

| | | | |
|---|---|---|---|
| 44 22 855 | 12/1995 | (DE) | C05F/17/00 |
| WO 93/24205 | 12/1993 | (WO) | B01D/53/00 |
| WO 98/30313 | 7/1998 | (WO) | B01D/53/84 |

OTHER PUBLICATIONS

English Abstract for German Patent No. DE4422855.

* cited by examiner

Primary Examiner—David A. Redding
(74) Attorney, Agent, or Firm—Senniger, Powers, Leavitt & Roedel

(57) ABSTRACT

The invention relates to a method for biological cleaning of a contaminated gas flow containing gaseous and/or particulate contaminants comprising the steps of contacting the contaminated gas flow counter-currently with a jet of suitable microorganism-containing scrubbing liquid in order to enhance absorption of gaseous and particulate contaminants in the scrubbing liquid; recovering the scrubbing liquid in a vessel; draining part of the scrubbing liquid from the vessel and compensating the drained part with fresh liquid. The method is carried out in a reverse jet scrubber and does not use any packing material for support to the microorganisms.

12 Claims, 1 Drawing Sheet

METHOD FOR BIOLOGICAL CLEANING OF A CONTAMINATED GAS FLOW

FIELD OF THE INVENTION

The present invention relates to an improved method for biological cleaning of a contaminated gas flow, more particularly a contaminated gas flow containing gaseous and/or particulate contaminants.

BACKGROUND OF THE INVENTION

In recent years, biological filtration has been increasingly used for cleaning gas and liquid streams originating from various industrial activities like production processes, waste water transport, waste water treatment and others. In biological methods, the neutralization of undesirable components of a gas or a liquid takes place by activity of microorganisms.

In biological gas treatment systems, mesophilic microorganisms are normally used. Mesophilic microorganisms grow in the temperature range of from about 10° C. to about 40° C. Thermophilic microorganisms, which grow in the temperature range of from about 40° C. to about 70° C., may also be used, but until now no effective commercial applications in gas treatment has been available; current reactor designs are not suitable because of the high growth rate of the thermophilic microorganisms or require an expensive multiple stage design.

Known biological gas purification systems comprise biofilters wherein the microorganisms grow on a matrix of wetted packing material, typically organic. As the gas is forced to pass through the packing material, contaminants from the gas are absorbed by the biofilm, which is a layer of water with microorganisms adsorbed on the packing material. The contaminants are essentially oxidized to carbon dioxide and water by microbial activity. Due to nutrient and/or space limitations in the matrix, no significant excess of additional biomass is formed, and the actual purification process by biological degradation of contaminants is limited, resulting in a reduced oxidation capacity. A biofilter is not suitable for thermophilic microorganisms, since these are capable of degrading organic packing material, leading to replacement of the packing material. The packing material is generally kept wet by a saturated gas flow and/or occasional spraying; a biofilter does not make use of a permanent liquid flow. The gas purification method making use of biofilters mostly is at least a two-stage process: first the gases are pretreated, particulate contaminants which may clog the matrix or packing material are removed, the pretreated contaminated gas is saturated with water, and finally treated in the actual biofilter. In this respect, reference is made to U.S. Pat. Nos. 4,662,900 and 4,806,148 and corresponding European Patent No. 0 142 872 and related prior art.

Another known biological gas purification system comprises so-called biotrickling filters (BTF). In the case of a BTF, the microorganisms grow on a packing material in the form of a biofilm. The contaminants from the gas are absorbed into the liquid that drips along the biofilm and diffuse into the biofilm where they are degraded by the microorganisms. The microorganisms and the degradation products such as water, carbon dioxide and occasionally mineral salts or acids are relinquished to the liquid. This liquid will moreover contain nutrients for the microorganisms in addition to acid or alkali to buffer the liquid to a neutral pH. Excessive growth of the biofilm can result in an increased pressure drop over the BTF and ultimately even lead to blocking of the BTF. Several mechanical or chemical procedures are applied to remove at least a part of the biofilm. Also methods are used to limit the growth of the microorganisms beforehand. Reference is made to U.S. Pat. No. 5,637,498 and corresponding PCT Publication No. WO 94/26392 and related prior art. These methods, however, generally reduce the effectiveness of the BTF. A BTF is not suitable for thermophilic microorganisms, as the high growth rate will further increase the clogging problems described previously. Similar to the biofilter, the BTF often is a two-stage process: particulate contaminants which are present in the contaminated gas flow and which may clog the matrix need to be removed before the gas flow enters the BTF.

Yet another known biological gas treatment system comprises a biological scrubber. In this case, the gas contaminants are first absorbed in a scrubbing liquid (absorption stage), generally in a packed bed. The liquid having absorbed therein at least part of the contaminants from the gas flow is collected in a tank from which it is recycled to the absorption stage. In order to keep the concentration of the contaminants in the liquid below their saturation level, part of the liquid is passed over a separate water treatment plant (treatment stage). Preferably, the absorption stage should remain free from microorganisms in order to enhance the transfer of the contaminants and prevent clogging problems. In the treatment stage the contaminants are partially transformed into biomass (microorganisms) and partially into water and carbon dioxide. The excess biomass needs to be removed from the system, more particularly from the scrubbing liquid, to a large extent before such scrubbing liquid is returned to the adsorption stage. When particulate contaminants are present in the gas flow, it is preferable to use a Venturi scrubber in order to best remove such particulate contaminants. In a Venturi scrubber, the contaminated gas is accelerated or injected into the liquid; but like most other known technologies to remove particulate contaminants from a gas flow, a Venturi scrubber has poor absorption capability for contaminants. For this reason the removal of particulate materials mostly is effected in a separate step upstream of the packed bed absorption column. This makes the bioscrubber a complex and expensive three-stage system.

A common problem to all three types of known biological gas treatment systems is that the packed beds or columns used for the biological treatment easily clog due to the increase of biomass and, in the case of the presence of particulate contaminants, due to such particulate contaminants.

SUMMARY OF THE INVENTION

Among the objects of the present invention, therefore, is to provide a method for biological purification of a gas flow which does not show the disadvantages of the known methods. More particularly, to provide a method for biological purification of a gas flow wherein a suitable quantity of relevant microorganisms grow under maximum growth conditions (which can be both, mesophilic and thermophilic) and which allows for the removal of particulate and gaseous contaminants from the gas flow to a large extent, in a single reactor.

Briefly, therefore, the present invention is directed to a method for cleaning a contaminated gas flow containing gaseous and/or particulate contaminants. The contaminated gas flow is contacted counter-currently with at least one jet (i.e., a high velocity stream forced though a narrow opening or nozzle under pressure) of suitable microorganism-containing scrubbing liquid in a froth zone in order to enhance absorption of contaminants in the scrubbing liquid. The scrubbing liquid is recovered in a vessel and contaminants absorbed in the recovered scrubbing liquid are biologically oxidized by the microorganisms contained therein. Scrubbing liquid recovered in the vessel is recirculated to the froth zone. Part of the scrubbing liquid is drained from the vessel and the drained part is compensated with fresh liquid.

Other objects and features of this invention will be in part apparent and in part pointed out hereinafter.

DETAILED DESCRIPTION OF THE PREFERRED EMBODIMENTS

Figure 1:
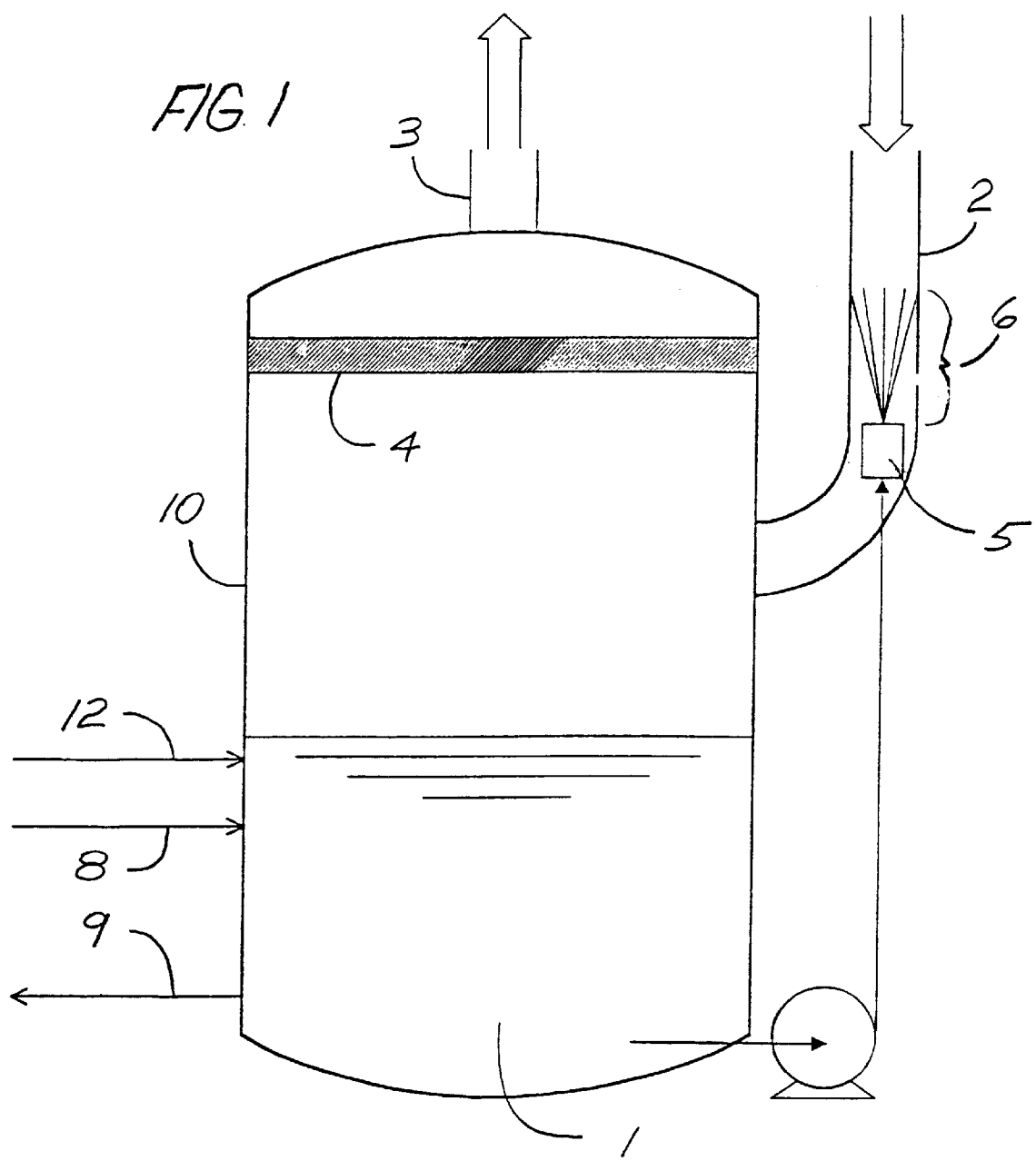
FIG. 1 is a schematic representation of a reverse jet scrubber reactor used in accordance with the invention.

In accordance with a preferred embodiment of the invention, the method is carried out in a reverse jet scrubber reactor of the type disclosed in U.S. Pat. No. 3,803,805, the entire disclosure of which is incorporated herein by reference. U.S. Pat. No. 3,803,805 discloses counter-current jet scrubbers that are particularly suitable for effective separation of gaseous and particulate contaminants from gas flows. FIG. 1 is a schematic representation of a reverse jet scrubber reactor used in accordance with the invention.

With reference to FIG. 1, such a reactor comprises a vessel 10 with a sump 1 containing a scrubbing liquid (e.g., water), a substantially vertical first gas duct 2 in fluid communication with the vessel for introducing the contaminated gas flow into the vessel, a second gas duct 3 in fluid communication with the vessel for discharging treated gas flow from the vessel and a nozzle 5 located in the first gas duct. Prior to start up, if not already present, the scrubbing liquid may be inoculated with a suitable population of microorganisms. Microorganisms (e.g., microorganisms found in activated sludge) that are usual and specific to degradation of the contaminants present in the gas flow to be treated can be used in the biological cleaning method according to the invention. The microorganisms are advantageously freely dispersed in the scrubbing liquid and the method does not require use of any packing material for support to the microorganisms.

Microorganism-containing scrubbing liquid is pumped from sump 1 through nozzle 5 which is positioned in a manner such that the jet of liquid discharged from the nozzle contacts the incoming contaminated gas flowing vertically downwards in inlet gas duct 2 counter-currently. In the zone where the counter-current gas and liquid flows collide, a froth zone 6 forms which enhances the intensive mixing and transfer of contaminants from the gas flow to the scrubbing liquid. The gas to liquid ratio in the froth zone controls the gas contaminant removal, which can be set independently. Treated gas from which contaminants have been removed passes into vessel 10 and is discharged through second gas duct 3. A demister 4 may be arranged near the inlet of the second gas duct in order to remove liquid droplets entrained in the treated gas.

The scrubbing liquid with the microorganisms (biomass or sludge) is recycled over reverse jet nozzle 5 and recovered in sump 1 of vessel 10, where biological oxidation of contaminants absorbed in the scrubbing liquid takes place. Scrubbing liquid recovered in the vessel is pumped from the sump through the nozzle and recirculated to the froth zone. The biomass concentration in the scrubbing liquid is controlled by adjusting the quantity of scrubbing liquid drained from the vessel in line 9. Make-up fresh liquid (e.g., tap water) is added to the vessel in line 12 to compensate for the drained scrubbing liquid and maintain the liquid level in the sump. Nutrients to support the microorganism population and/or other additives (e.g., oxidizing agents such as oxygen or hydrogen peroxide) in line 8 may be added directly to the liquid in the vessel.

In the practice of the present invention, the reverse jet scrubber reactor design disclosed in U.S. Pat. No. 3,803,805 allows for a high solids concentration in the liquid flow, a high microorganism concentration and a high particulate concentration may be applied. This results in a very biologically active liquid and a very small waste water stream. The whole system contains only a minimal number of serviceable parts and is very robust. Moreover, particulate contaminants not subject to biological degradation by the microorganisms that might lead to clogging in conventional biological gas purification systems in the absence of pretreatment, are effectively removed from the gas without adverse consequence.

Surprisingly, the method of the invention allows for an efficient purification of a contaminated gas flow which contains gaseous and particulate contaminants and allows for a biological treatment of the absorbed contaminants by appropriate microorganisms. Contrary to the skilled person's expectations, the microorganisms are not significantly destroyed in the course of the absorption process and may pursue their activity in the vessel in which the scrubbing liquid is collected. The scrubbing liquid with the microorganisms is recycled over the reverse jet to the sump, where biological oxidation of contaminants takes place and then is recirculated through the nozzle to the reverse jet froth zone. Particulate contaminants from the gas flow are also transferred to the liquid and are mixed with the microorganisms.

As will easily be understood by those skilled in the art, the method of the present invention allows for all duties effected by a biological scrubber to be performed simultaneously in one single reactor.

1. Gas cleaning by absorption of gaseous contaminants in the scrubbing liquid. The reverse jet scrubber brings the contaminated gas in intimate contact with the scrubbing liquid. By varying the gas/liquid ratio in the froth zone and/or the number of jets in series, the transfer with an adequate efficiency can easily be controlled. Preferably, the gas to liquid ratio in the froth zone is from about 8 to about 40.

2. Transferring the contaminants to the microorganisms. By recycling large quantities of scrubbing liquid over the reactor and the thorough mixing in the froth zone, the microorganisms are brought in intimate contact with the contaminants.

3. Unrestricted growth of the microorganisms. The microorganisms are freely dispersed in the liquid. Nutrients may be added to the sump of the reactor and the carbon source may be available from the contaminated gas flow. The reverse jet scrubber is capable of handling high solid concentrations, so high biomass concentrations are acceptable without the danger of clogging. The reactor has no internals, which may clog. For example, the froth zone preferably does not contain any packing material or similar means for promoting mass transfer between the gas and liquid phases. The nozzles may be designed with a bore sufficiently large to avoid clogging while allowing suitable liquid flow.

Preferably, the bore diameter of the nozzles is from about 10 mm to about 50 mm, more preferably from about 30 mm to about 50 mm. The use of thermophilic microorganisms is possible, as the high growth rates and the associated high biomass formation rates do not pose a problem.

4. Oxygen requirement for biological oxidation. For biological oxidation oxygen is required. All or a part of the required oxygen is transferred from the gas being treated to the liquid in the froth zone of the reverse jet. A reverse jet scrubber uses a high gas to liquid ratio, so that relative much oxygen is transferred to the liquid. In case more oxygen is required for the biological reaction, additional oxygen may be introduced into the vessel (e.g., injected into the liquid collected in the sump using an immersion aerator).

5. Biomass concentration and removal of excess sludge. As the scrubbing liquid is recycled over the reverse jet, part of the liquid is evaporated in the froth zone. Fresh liquid is added to maintain a suitable water level in the reactor vessel. To remove the scrubbed particulate contaminants and the excess biomass, a small liquid flow is bled from the reactor vessel. The lower the liquid flow, the higher the concentration of particulate contaminants and biomass that will accumulate in the reactor vessel. The concentration of microorganisms determines the oxidation capacity of the system. The reverse jet design allows for very high solids concentration, so the biological oxidation capacity can be maximized and the waste water flow can be minimized simultaneously.

The invention is described hereinafter in more detail by way of examples with reference to the reactor shown in FIG. 1. The following examples are merely for the purpose of illustration and are not to be regarded as limiting the scope of the invention or manner in which it may be practiced.

EXAMPLE 1

A contaminated gas flow from a particle board operation containing formaldehyde (30–80 mg/m$^3$ at 0° C. and dry stage) and wood particles (25–50 mg/m$^3$ at 0° C. and dry stage) was treated in a reverse jet scrubber reactor as per the present invention.

The test reactor comprised vessel 10 with a sump 1 of 800 l filled with water containing microorganisms as the scrubbing liquid, an inlet gas duct 2 having a diameter of about 100 mm running substantially vertically into the vessel and a second gas duct 3 having a diameter of about 400 mm running out of the vessel to release the treated gas flow again from the reactor. A demister 4 was arranged near the inlet of the second gas duct in order to remove water droplets entrained in the treated gas. The scrubbing liquid was pumped from the sump through a nozzle 5 having a bore diameter of about 10 mm arranged in the inlet duct so as to direct the jet of scrubbing liquid vertically upward, counter-current to the incoming gas flowing vertically downward in the inlet duct. A froth zone 6 of approximately 0.5 m was formed in the inlet duct where the incoming gas and the scrubbing liquid collide.

Approximately 500–1000 m$^3$/h (at 0° C. and dry stage) of gas was passed through the reactor. The dry bulb temperature of the gas flow was approximately 70° C. and the wet bulb temperature approximately 60° C. Approximately 15 m$^3$/h of scrubbing liquid was recycled over the reverse jet nozzle and the equilibrium temperature of the scrubbing liquid was about 60° C. During the test, adequate quantities of nutrients (urea and phosphoric acid) were added in line 8 to the scrubbing liquid. Approximately 12 l/h of scrubbing liquid was drained from the sump in line 9 and make-up tap water was added in line 12 to maintain the liquid level in the sump.

Formaldehyde was removed with an efficiency of between 75% and 90%, with outlet gas concentrations comprised between 5 and 10 mg/m$^3$ (at 0° C. and dry stage). The wood fibers were removed with an efficiency of about 85% to 95%. The solids concentration in the sump was approximately 2 g/l of which approximately 20% was biomass. The formaldehyde concentration in the sump varied between 0.5 mg/l and 5 mg/l.

The above process ran stable for more than a month at temperatures, which varied between 45° C. and 65° C. due to variations in the conditions of the gas flow. The biomass (microorganisms) concentration was maintained by adjusting the drain liquid flow. No blockage of any kind was observed during the operation.

EXAMPLE 2

An artificial gas flow containing 350 mg/m$^3$ (at 0° C. and dry stage) of methanol was treated in a reactor similar to the one used in Example 1, in accordance with the invention.

Approximately 500 m$^3$/h (at 0° C. and dry stage) of gas was passed through the reactor. The dry bulb temperature of the gas flow was 25° C. and the wet bulb temperature 18° C. Approximately 20 m$^3$/h of water containing microorganisms as the scrubbing liquid was recycled over the reverse jet nozzle and the equilibrium temperature of the scrubbing liquid was 18° C. During the test adequate quantities of nutrients (urea and phosphoric acid) were added to the scrubbing liquid. Approximately 2 l/h of scrubbing liquid was drained from the sump and make-up tap water was added to maintain the liquid level in the sump.

The removal efficiency of the methanol varied between 75% and 85% with outlet gas concentrations between 50–90 mg/m$^3$ (at 0° C. and dry stage). The biomass concentration in the sump was approximately 35 g/l. The methanol concentration in the sump was approximately 2 mg/l.

The above process was stable for one month at ambient temperatures. The biomass (microorganisms) concentration was maintained by adjusting the drain liquid flow. No blockage of any kind was observed during the operation.

What is claimed is:

1. A method for cleaning a contaminated gas flow containing gaseous and/or particulate contaminants comprising the steps of:

contacting the contaminated gas flow counter-currently with a jet of suitable microorganism-containing scrubbing liquid in a froth zone in order to enhance absorption of contaminants in the scrubbing liquid;

recovering the scrubbing liquid in a vessel, contaminants absorbed in the recovered scrubbing liquid being biologically oxidized by the microorganisms contained therein;

recirculating scrubbing liquid recovered in the vessel to the froth zone;

draining part of the scrubbing liquid from the vessel; and compensating the drained part with fresh liquid.

2. A method as set forth in claim 1 wherein the method is carried out in a reverse jet scrubber reactor, the reactor comprising the vessel, a substantially vertical first gas duct in fluid communication with the vessel for introducing the contaminated gas flow into the vessel, a second gas duct in fluid communication with the vessel for discharging treated gas flow from the vessel and a nozzle disposed within the first gas duct and positioned to direct the jet of microorganism-containing scrubbing liquid counter-currently to contaminated gas flowing vertically downwards into the vessel, thereby generating the froth zone in which contaminants in the gas flow are transferred to and absorbed in the scrubbing liquid, the vessel having a sump therein in which the scrubbing liquid is recovered, recovered microorganism-containing scrubbing liquid being recirculated from the sump to the froth zone through the nozzle.

3. A method as set forth in claim 1 wherein the microorganisms are freely dispersed in the scrubbing liquid.

4. A method as set forth in claim 1 wherein the scrubbing liquid is water.

5. A method as set forth in claim 1 wherein the biomass concentration in the microorganism-containing scrubbing liquid is controlled by adjusting the quantity of scrubbing liquid drained from the reactor vessel.

6. A method as set forth in claim 1 wherein the microorganism-containing scrubbing liquid contains thermophilic microorganisms that are used for the biological oxidation of absorbed contaminants.

7. A method as set forth in claim 6 wherein the operating temperature of the scrubbing liquid is from about 40° C. to about 70° C.

8. A method as set forth in claim 1 wherein nutrients suitable for the microorganisms present in the scrubbing liquid are added to the scrubbing liquid.

9. A method as set forth in claim 1 wherein oxygen is introduced into the reactor vessel.

10. A method as set forth in claim 1 wherein the gas to liquid ratio in the froth zone is from about 8 to about 40.

11. A method as set forth in claim 2 wherein the nozzle has a bore diameter of from about 10 mm to about 50 mm.

12. A method for cleaning a contaminated gas containing gaseous and/or particulate contaminants comprising the steps of:

flowing the contaminated gas vertically downward in a substantially vertical first gas duct;

discharging a jet of suitable microorganism-containing scrubbing liquid from a nozzle disposed within the first gas duct, the nozzle being positioned within the first gas duct such that the contaminated gas flow contacts the jet of scrubbing liquid counter-currently, thereby generating a froth zone in which contaminants in the gas flow are transferred to and absorbed in the scrubbing liquid and producing a treated gas flow;

recovering the scrubbing liquid in a vessel in fluid communication with the first gas duct, contaminants absorbed in the recovered scrubbing liquid being biologically oxidized by the microorganisms contained therein;

discharging the treated gas flow from the vessel through a second gas duct in fluid communication with the vessel;

recirculating scrubbing liquid from the vessel to the froth zone through the nozzle;

draining part of the scrubbing liquid from the vessel; and compensating the drained part with fresh liquid.

* * * * *